(12) United States Patent
Dwyer et al.

(10) Patent No.: US 9,103,567 B2
(45) Date of Patent: Aug. 11, 2015

(54) PHOTOVOLTAIC ARRAY UTILIZING PHYLLOTAXIC ARCHITECTURE

(75) Inventors: Aidan Rhys Dwyer, Northport, NY (US); Sean Patrick Dwyer, Northport, NY (US)

(73) Assignee: SEQUENCE DESIGN LTD., Northport, NY (US)

( * ) Notice: Subject to any disclaimer, the term of this patent is extended or adjusted under 35 U.S.C. 154(b) by 34 days.

(21) Appl. No.: 13/445,717

(22) Filed: Apr. 12, 2012

(65) Prior Publication Data

US 2012/0260967 A1     Oct. 18, 2012

Related U.S. Application Data

(60) Provisional application No. 61/517,092, filed on Apr. 14, 2011.

(51) Int. Cl.
*H01L 31/042*     (2014.01)
*F24J 2/54*     (2006.01)
*F24J 2/52*     (2006.01)

(52) U.S. Cl.
CPC ............... *F24J 2/5417* (2013.01); *F24J 2/523* (2013.01); *H02S 20/00* (2013.01); *Y02E 10/47* (2013.01); *Y02E 10/50* (2013.01)

(58) Field of Classification Search
CPC . H01L 31/02008; H01L 31/042; H02J 7/355; F24J 2/523; F24J 2/5417; Y02E 10/50; Y02E 10/47; H02S 20/00
USPC ........................................................ 136/244
See application file for complete search history.

(56) References Cited

U.S. PATENT DOCUMENTS

| | | |
|---|---|---|
| 4,365,106 A | 12/1982 | Pulvari |
| 6,037,535 A | 3/2000 | Yoshino |
| 7,888,584 B2 | 2/2011 | Lyden |

(Continued)

FOREIGN PATENT DOCUMENTS

| | | | |
|---|---|---|---|
| JP | 11168228 A | * | 6/1999 |
| JP | 20033152214 A1 | | 5/2003 |

(Continued)

OTHER PUBLICATIONS

McGhee, "Theorectical Morphology", Columbia University Press, 1999, pp. 252, 260, and 261.*

(Continued)

*Primary Examiner* — Devina Pillay
(74) *Attorney, Agent, or Firm* — John M. Hammond; Patent Innovations LLC

(57) ABSTRACT

An array of photovoltaic panels comprising a plurality of primary branches extending radially outwardly from a central trunk, and a plurality of photovoltaic panels joined to the primary branches, wherein the primary branches extend outwardly from the trunk in a spiral arrangement having a ratio of x turns around the trunk for every y primary branches. The ratio of x:y may be derived from a phyllotaxic arrangement of branches and leaves on a plant. X may be a Fibonacci number, with y being its Fibonacci second successor. The ratio of x/y may be selected from certain Fibonacci ratios, including 1/3, 2/5, 3/8, and 5/13. A method of converting electromagnetic radiation to electrical energy, and a method of making a device for converting electromagnetic radiation to electrical energy in accordance with the invention are also disclosed.

14 Claims, 8 Drawing Sheets

(56) References Cited

U.S. PATENT DOCUMENTS

| | | |
|---|---|---|
| 2005/0045224 A1* | 3/2005 | Lyden .......................... 136/291 |
| 2006/0011194 A1* | 1/2006 | Hensley et al. ............... 126/655 |
| 2010/0186797 A1 | 7/2010 | Joshi |
| 2010/0289269 A1 | 11/2010 | Christy et al. |

FOREIGN PATENT DOCUMENTS

| | | |
|---|---|---|
| JP | 2004281788 A1 | 10/2004 |
| JP | 2010056109 A1 | 3/2010 |

OTHER PUBLICATIONS

Hopkins, "A latitudinal cline and response to vernalization in leaf angle and morphology in *Arabidopsis thaliana* (Brassicaceae)", New Phytologist, vol. 179, pp. 155-164, Jul. 2008.*

Takenaka, "A Simulation Model of Tree Architecture Development Based on Growth Response to Local Light Environment", J. Plant Research, vol. 107, pp. 321-330, Sep. 1994.*

Machine Translation, JP11168228A, Jun. 1999.*

* cited by examiner

PHOTOVOLTAIC ARRAY UTILIZING PHYLLOTAXIC ARCHITECTURE

CROSS-REFERENCE TO RELATED PATENT APPLICATIONS

This application claims priority to U.S. Provisional Patent Application No. 61/517,092 filed Apr. 14, 2011, the disclosure of which is incorporated herein by reference.

BACKGROUND

1. Technical Field

This invention pertains to devices and methods for collecting electromagnetic radiation and converting such electromagnetic radiation to electrical energy. In particular, the invention relates to devices and methods for converting solar radiation to electrical energy.

2. Description of Related Art

Phyllotaxis is the ordered arrangement of branches and leaves on a plant. The basic patterns are alternate, opposite, whorled, or spiral. With an alternate pattern, branches or leaves switch from side to side. An alternate distichous phyllotaxis means that each branch or leaf growing at a single node is disposed in a single rank along the branch (such as in grasses). In an opposite pattern, two branches or leaves grow in opposite directions from the same node. In an opposite pattern, if successive branch or leaf pairs are perpendicular, this is called decussate. A whorled pattern consists of three or more leaves at each node. An opposite branch or leaf pair can be thought of as a whorl of two branches or leaves. A whorl can occur as a basal structure in which all of the leaves or branches are attached at the base of a shoot or stem, and the internodes are small or nonexistent. A basal whorl with a large number of branches or leaves spread out in a circle is called a rosette. A multijugate pattern is a spiral composed of whorls.

A repeating spiral branch or leaf arrangement can be represented by a fraction or ratio describing the sequence of windings branch-by-branch and/or leaf-by-leaf. The ratio is expressed with the denominator being the number of branches or leaves emanating from a stem or branch, and the numerator being the number of spiral rotations around the stem or branch over which those leaves or branches are distributed.

It has been observed that the numerator and denominator often consist of a Fibonacci number and its second successor, respectively. In general, a Fibonacci sequence is a set of numbers that starts with a one or a zero, followed by a one, and proceeds based on the rule that each number (called a Fibonacci number) is equal to the sum of the preceding two numbers. If the Fibonacci sequence is denoted F(n), where n is the first term in the sequence, the following equation obtains for n=0, where the first two terms are defined as 0 and 1 by convention:

$$F(0)=0, 1, 1, 2, 3, 5, 8, 13, 21, 34 \ldots$$

In some cases, it is customary to use n=1 as a first term, such that the first two terms are defined as 1 and 1 by default, and therefore:

$$F(1)=1, 1, 2, 3, 5, 8, 13, 21, 34 \ldots$$

Mathematically, the Fibonacci sequence is expressed by the formula:

$$F(1)=1$$

$$F(2)=1$$

$$F(n)=F(n-1)+F(n-2)$$

The Fibonacci sequence appears as a mathematical pattern in many phenomena in nature, including the phyllotaxic architecture in trees and plants. Deciduous trees such as the oak, elm, cherry, and beech species have unique phyllotaxic patterns in their branches and leaves that generally correspond to the Fibonacci sequence. As described previously, the repeating spiral pattern of branches in each species can be represented by a fraction describing the angle of anti-clockwise windings branch-by-branch and/or leaf-by-leaf, with the numerator and denominator consisting of a Fibonacci number and its second successor.

For example, starting at a branch on the main trunk in the oak species, the general phyllotaxic architecture pattern of branches is observed to be five (5) branches distributed over a spiral of two rotations around the trunk. At two rotations, the next branch is positioned vertically and directly above the starting point, and the 2/5 rotation/branch pattern repeats. Thus, the Fibonacci pattern is mathematically expressed as 2/5. Other species of trees are also observed to have unique Fibonacci architecture. In the elm species, alternate branches or leaves will have a Fibonacci pattern of 1/2, i.e., one rotation has two leaves/branches. In beech and hazel, the Fibonacci architecture is 1/3, one rotation having three leaves/branches. In poplar and pear trees, the ratio is 3/8, and in willow and almond the ratio is 5/13. TABLE 1 provides a summary of the observed spiral windings in the phyllotaxic architecture of these common trees.

TABLE 1

Fibonacci architecture of branches and leaves in some common trees.

| TREE SPECIES | BRANCHES | TURNS |
|---|---|---|
| Oak | 5 | 2 |
| Elm | 2 | 1 |
| Cherry | 3 | 2 |
| Beech | 3 | 1 |
| Poplar | 5 | 2 |
| Weeping willow | 8 | 3 |
| Pear | 8 | 3 |
| Almond | 13 | 8 |

The number of branches or leaves is sometimes called rank, in the case of simple Fibonacci ratios, because the leaves or branches line up in vertical rows. It is believed that phyllotaxic architecture improves the efficiency of photosynthesis in trees and plants.

A photovoltaic ("PV") array is a linked collection of photovoltaic modules, which are in turn made of multiple interconnected solar cells. The cells convert solar energy into direct current electricity via the photovoltaic effect. The power that one module can produce is seldom enough to meet requirements of a home or a business, so a plurality of modules are linked together to form an array. Most PV arrays use an inverter to convert the DC power produced by the modules into alternating current that can connect to the existing infrastructure to power lights, motors, and other loads. The modules in a PV array are usually first connected in series to obtain the desired voltage; the individual strings are then connected in parallel to allow the system to produce more current.

At high noon on a cloudless day at the equator, the power of the sun is about 1 kW/m², on the Earth's surface, to a plane that is perpendicular to the sun's rays. Mechanized tracking devices are a common technique utilized to assist PV arrays to track the sun through each day to greatly enhance energy collection. However, tracking devices add cost and require maintenance, so it is more common for PV arrays to have fixed mounts that tilt the array and face due South in the Northern Hemisphere. (Alternatively in the Southern Hemisphere, arrays face due North). The tilt angle can be varied for the season, but if fixed, should be set to give optimal array output during the peak electrical demand portion of a typical year. Fixed positioning, even under optimal conditions, however, has inherent limitations that can compromise the production of electricity. In extreme northern and southern latitudes, the declination and latitude of the sun during winter months can greatly reduce the efficiency of a conventional PV array.

Other factors adversely affect PV array performance. The electrical output of photovoltaic cells is extremely sensitive to shading. When a portion of a PV array is shaded, the output falls dramatically due to electrons reversing course through the shaded portion of the p-n junction. Therefore, it is extremely important that a conventional PV array is not shaded by trees, architectural features, flag poles, or other obstructions. PV array efficiency can also be adversely affected by atmospheric and organic factors. Sunlight can be absorbed by dust, fallout, precipitation or other impurities at the surface of a module. This can cut down the amount of light that actually strikes the cells by as much as half. Maintaining a clean module surface will increase output performance over the life of the module. Module output and life are also degraded by increased temperature. By allowing ambient air to flow over PV modules, and if possible, behind them, this problem is reduced. Conventional PV array designs do not normally allow or compensate for these adverse factors, thereby diminishing the power efficiency of the PV array.

In view of the multitude of factors that adversely affect the overall efficiency and economics of solar energy conversion, there remains a need for solar arrays with improved efficiency in collecting and converting solar energy to useable electrical energy.

SUMMARY

In accordance with the present disclosure, the problem of efficiently collecting electromagnetic energy and converting such energy to electrical energy is solved by arranging a plurality of energy collecting panels in an array that mimics the geometrical arrangement of leaves and branches of plants. In other words, the plurality of energy collecting panels is arranged such that the panel array has a phyllotaxic architecture.

In one aspect of the invention, the energy collecting panels may be photovoltaic panels that collect solar energy. Accordingly, there is provided an array of photovoltaic panels comprising a plurality of primary branches extending radially outwardly from a central trunk, and a plurality of photovoltaic panels joined to the primary branches, wherein the primary branches extend outwardly from the trunk in a spiral arrangement having a ratio of x turns around the trunk for every y primary branches. The ratio of x:y may be derived from a phyllotaxic arrangement of branches and leaves on a plant. X may be a Fibonacci number, with y being its Fibonacci second successor. The ratio of x/y may be selected from certain Fibonacci ratios, including 1/3, 2/5, 3/8, and 5/13. In embodiments in which the number of primary branches is greater than y, the spiral arrangement may be partially repeated if the number is between y and 2y, or repeated multiple times if the number of primary branches is greater than 2y.

In certain embodiments, the primary branches may be further comprised of secondary branches extending outwardly from the primary branches in the repeating spiral arrangement of x turns around a primary branch for every y secondary branches, wherein the photovoltaic panels are joined to the secondary branches. In embodiments in which the number of secondary branches is greater than y, the spiral arrangement may be partially repeated if the number is between y and 2y, or repeated multiple times if the number of primary branches is greater than 2y. In one embodiment, the primary branches may emanate upwardly from the central trunk at an angle of 30 degrees from horizontal.

In further embodiments, the secondary branches may be further comprised of tertiary branches extending outwardly from the secondary branches in the repeating spiral arrangement of x turns around a secondary branch for every y tertiary branches. The photovoltaic panels may be joined to the tertiary branches.

The branching may be continued in the same manner until a sufficient number of terminal branches for the required amount of photovoltaic panels for the PV array are provided. If n is the number of levels of branches in the hierarchy of branches, the final branches are the nth level of branches; accordingly, the (n−1)th branches are comprised of a plurality of nth branches extending outwardly from the (n−1)th branches in the repeating spiral arrangement of x turns around the (n−1)th branch for every y nth branches. The photovoltaic panels are joined to the nth branches, the final branches in the hierarchy.

Also according to the present disclosure, there is provided a method of converting electromagnetic radiation to electrical energy comprising joining a plurality of energy collecting panels to a plurality of primary branches in an array, the primary branches extending radially outwardly from a central trunk in a spiral arrangement having a ratio of x turns around the trunk for every y primary branches; exposing the plurality of energy collecting panels to electromagnetic radiation; and, within the energy collecting panels, converting energy from the electromagnetic radiation to electrical energy. In an application of solar energy conversion in which the electromagnetic radiation is solar radiation, the energy collecting panels may be photovoltaic panels. In other applications, the energy collecting panels may be utilized in other forms and functions in order to increase the efficiency of detection and collection of other ranges of the electromagnetic spectrum. These applications can serve as useful methods in signal reception and transmission as well as scientific research.

By way of example, the energy collecting panels may be utilized in a panel antenna array for receiving radio waves used for wireless transmission of sound messages, or information, for communication, as well as for maritime and aircraft navigation. The information may be imposed on the electromagnetic carrier wave as amplitude modulation (AM) or as frequency modulation (FM) or in digital form (pulse modulation). Transmission therefore may involve not only a single-frequency electromagnetic wave, but also a frequency band, the width of which is proportional to the information density. The width is about 10,000 Hz for telephone, 20,000 Hz for high-fidelity sound, and five megahertz (1 MHz=one million hertz) for high-definition television.

The energy collecting panels may also be configured as a panel antenna array for the identification, reception and collection of higher frequencies of the electromagnetic spectrum such as gamma rays. Gamma rays are emitted as the result of transitions within the atomic nucleus, including nuclei of certain radioactive materials (natural and artificial). Gamma rays also originate from nuclear explosions and a variety of other sources in outer space. Individual gamma-ray photons contain so much energy that they are easily detected, but the extremely small wavelength limits the experimental observation of any wavelike properties. Gamma rays originating from the hottest regions of the universe, including supernova explosions, neutron stars, pulsars, and black holes, travel through vast distances in space to reach the Earth. This high-energy form of radiation has wavelengths less than one-hundredth of a nanometer (10 picometers), photon energies greater than 500 kiloelectron-volts (keV), and frequencies exceeding 30 exahertz (EHz). The present invention may be utilized for the identification and collection of other high energy forms of electromagnetic radiation such as x-rays.

The energy collecting panels may also be configured as a panel antenna array for the identification, reception and collection of infrared radiation (IR) bands of electromagnetic radiation that extend from the far-red portion of the visible light spectrum (around 700-780 nanometers) to about one millimeter in wavelength. With photon energies ranging from approximately 1.2 millielectron-volts to slightly less than 1.7 electron-volts, infrared waves have corresponding frequencies between 300 gigahertz (GHz) and approximately 400 terahertz (THz). This type of radiation is associated with the thermal region where visible light is not necessarily detectable or even present. For example, the human body does not emit visible light, but it does emit weak infrared radiation, which is felt and can be recorded as heat. The emission spectrum begins at about 3000 nanometers and ranges beyond the far infrared, peaking at approximately 10000 nanometers.

The energy collecting panels may also be configured as a panel array for the identification, reception and collection of microwaves. Microwaves constitute the highest frequency radio waves, and are emitted by the Earth, buildings, cars, airplanes, and other large objects. In addition, low-level microwave radiation permeates space, where it is speculated to have been released during the creation of the universe. Higher frequency microwaves are the basis for RADAR, an acronym that stands for RAdio Detecting And Ranging, a transmission and reception technique used in tracking large objects and calculating their speed and distance. Astronomers utilize extraterrestrial microwave radiation to study the Milky Way and other nearby galaxies. A significant amount of astronomical information has been derived from studying a specific emission wavelength (21-centimeters or 1420-megahertz) of uncharged hydrogen atoms, which are widely distributed throughout space. Microwaves are also employed for transporting information from Earth to orbiting satellites in vast communications networks, for relaying information from ground-based stations over long distances, and in terrain mapping.

Also according to the present disclosure, there is provided a method of making a device for converting electromagnetic radiation to electrical energy. The method is comprised of identifying a phyllotaxic architecture of a plant to apply to an arrangement of energy collecting panels of the device, and joining a plurality of the energy collecting panels to a plurality of primary branches in an array, the primary branches extending radially outwardly from a central trunk in a spiral arrangement having a ratio of x turns around the trunk for every y primary branches in accordance with the phyllotaxic architecture.

BRIEF DESCRIPTION OF THE DRAWINGS

The present disclosure will be provided with reference to the following drawings, in which like numerals refer to like elements, and in which.

Figure 1:
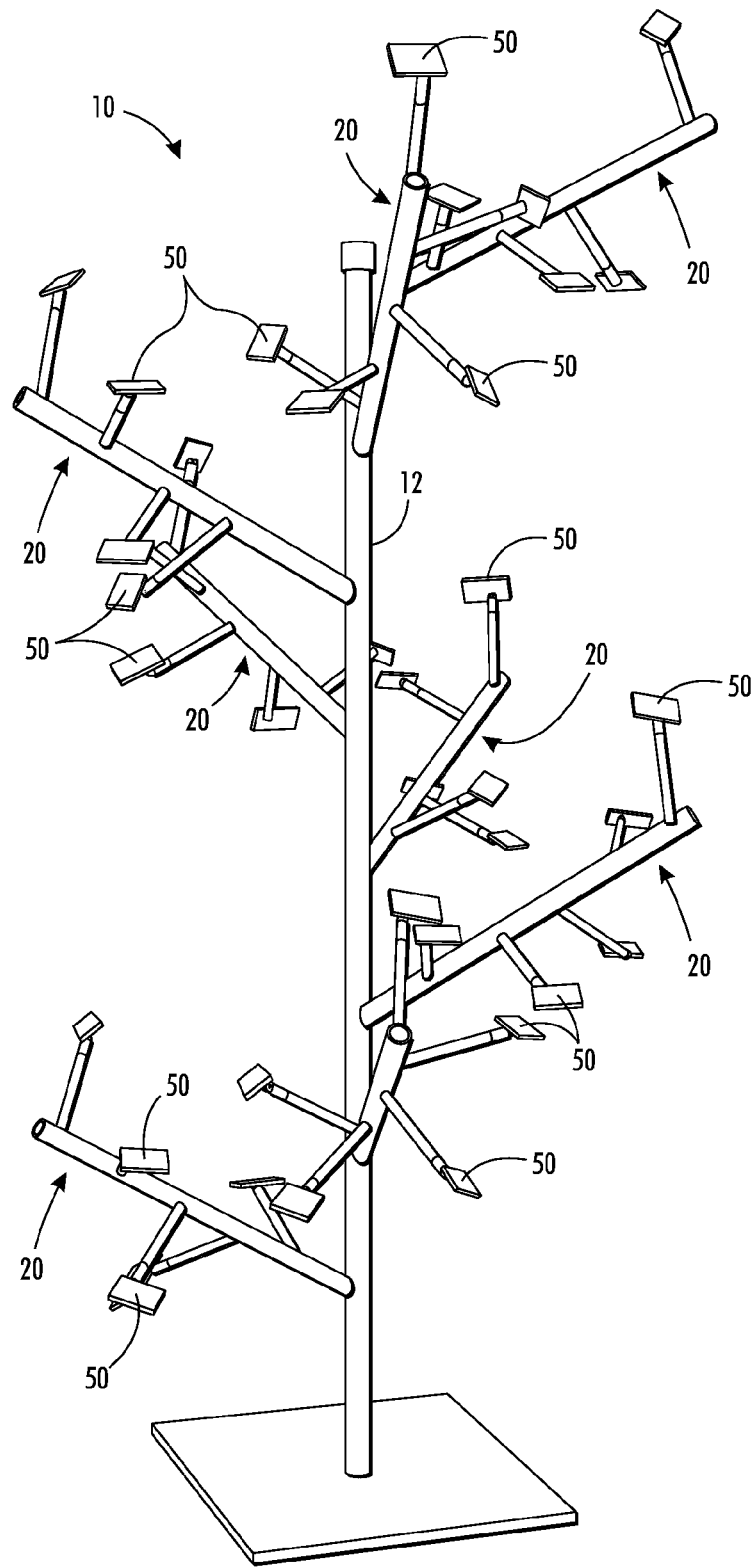
FIG. 1 is a perspective view of one exemplary photovoltaic array in accordance with the present disclosure.

The present invention will be described in connection with a preferred embodiment. However, it is to be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. In the following disclosure, the present invention is described in the context of its use as a solar array for conversion of solar energy to electrical energy. However, it is not to be construed as being limited only to use in solar energy conversion. The invention is adaptable to any use in which the conversion of electromagnetic energy to electrical energy is the desired result.

In one embodiment, in accordance with the present disclosure, there is provided a photovoltaic (PV) array of solar panels arranged in a manner utilizing phyllotaxic architecture. In particular, the panels and the supporting structures ("branches") that support them may be arranged in a Fibonacci sequence found in the branches and leaves of specific deciduous tree species. This is in marked contrast to the current practice of arranging solar panels in a conventional flat rectangular format of rows and columns.

In accordance with the present disclosure, there are also provided a method of making a PV array having phyllotaxic architecture, and a method of collecting solar energy from a PV array having phyllotaxic architecture.

The configuration of the PV arrays in accordance with the invention may increase the efficiency of the PV arrays in a variety of ways including, but not limited to the following:

permitting a PV array to utilize the greatest quantity of PV panels within the least amount of physical space, thereby maximizing the ability of the array to operate in confined and obstructed areas;

the collection of more sunlight by the PV array when the sun is located at lower altitudes and declinations such as found in more extreme northern and southern regions of the respective Northern and Southern hemispheres, or during winter months;

the duration of time that collection of sunlight takes place during the solar day;

the collection of sunlight under circumstances when there are shadows or objects that obstruct exposure to direct sunlight;

the minimization of drop-off of voltage at the p-n junction when shadows are cast upon the array or direct sunlight is obstructed;

the placement and configuration of PV panels in an array that permits air to flow around and behind each solar panel thereby minimizing the effect of extreme temperatures on the efficiency of each panel;

the placement and configuration of PV panels in an array that minimizes the accumulation of foreign and organic materials on each panel which can reduce the efficiency of each panel; and the placement and configuration of PV panels in the array that minimizes the effect of ambient weather conditions including precipitation and snow upon the efficiency of each PV panel.

FIG. 1 is a perspective view of one exemplary photovoltaic array, which is provided in accordance with the present invention. The overall broad concepts of the invention will be described using the array of FIG. 1 as an example, with it being understood that there is no intent to limit the invention to the configuration depicted in FIG. 1.

Referring now to FIG. 1, an array 10 of photovoltaic panels is provided comprising a plurality of primary branches 20 extending radially outwardly from a central trunk 12. A plurality of photovoltaic panels (some of which are designated with the number 50 in FIG. 1) are joined to the primary branches 20.

Figure 2:
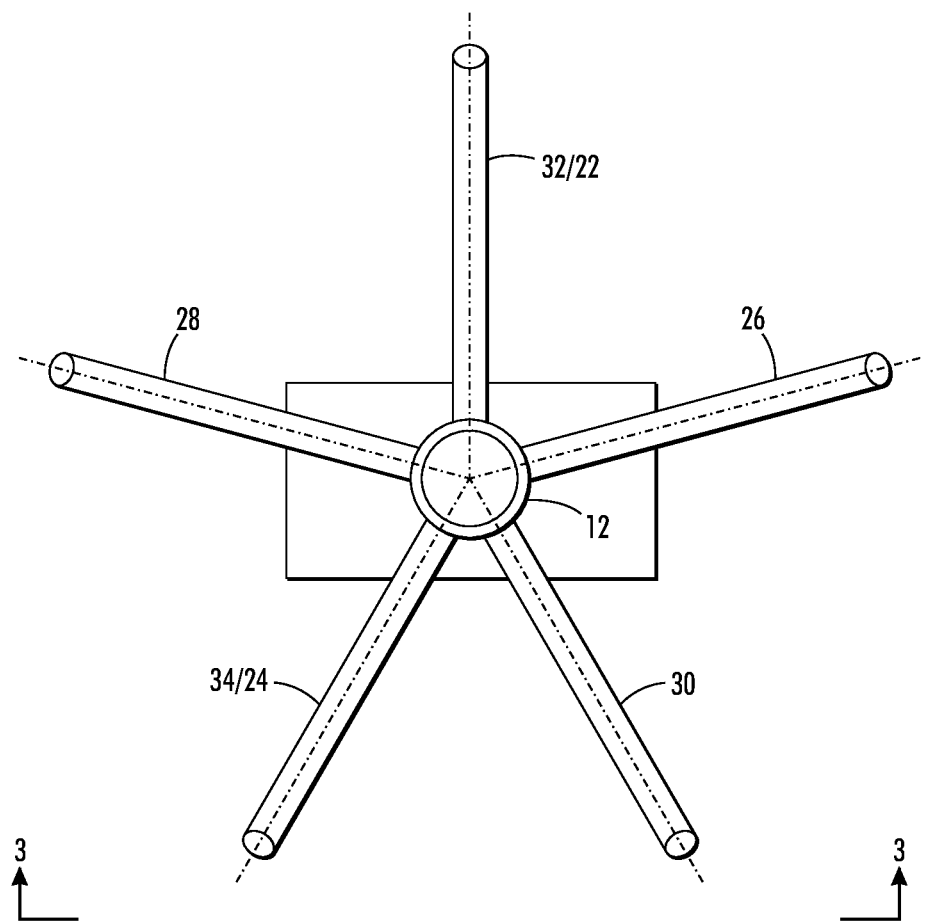
FIG. 2 is a top view of a portion of a photovoltaic array constructed in a similar manner to the array of FIG. 1, the view depicting primary branches extending outwardly from a central trunk.
Figure 3:
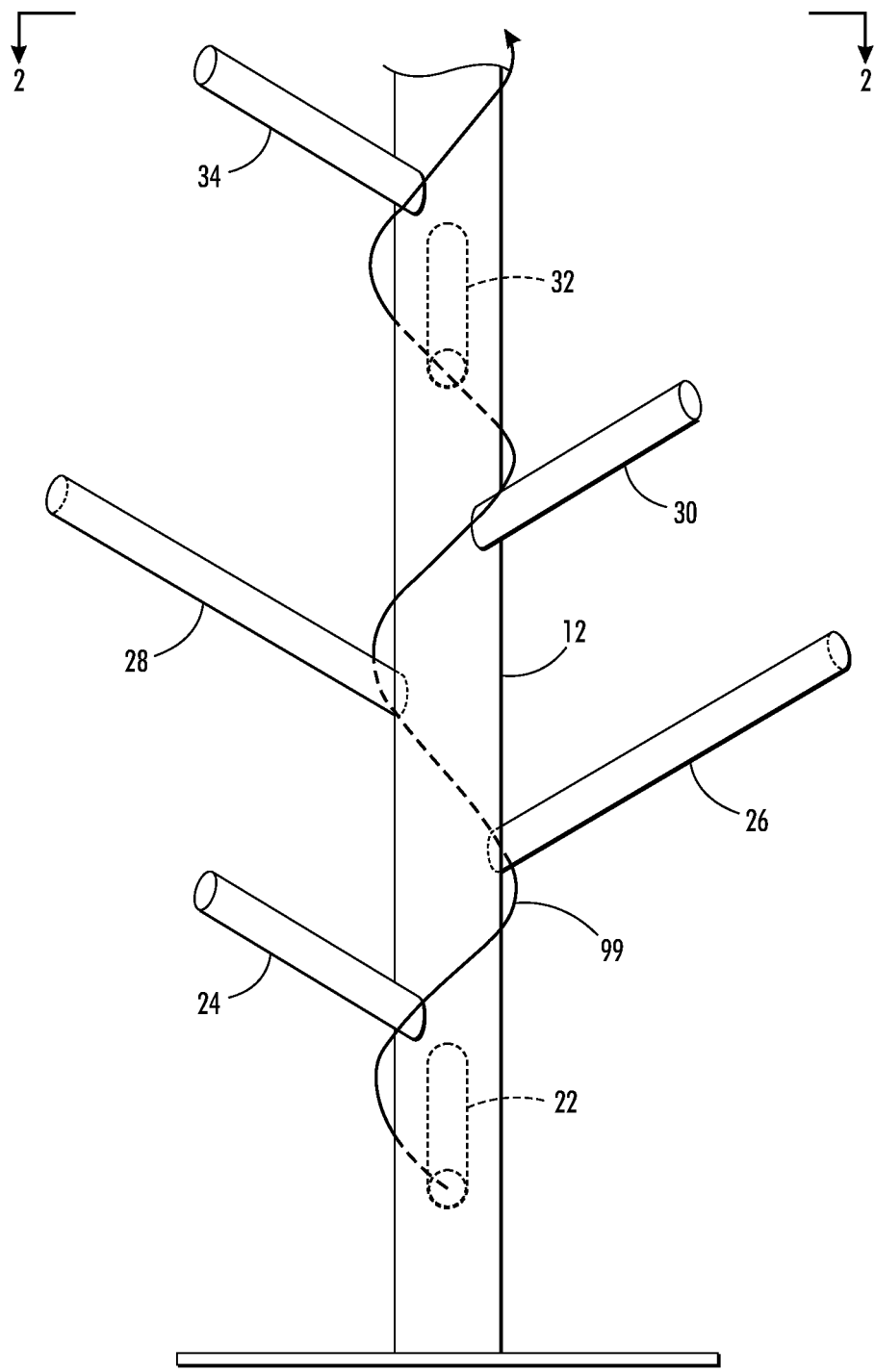
FIG. 3 is a side elevation view of the portion of the array of FIG. 2, taken along line 3-3 of FIG. 2.

The primary branches 20 extend outwardly from the trunk 12 in a spiral arrangement having a ratio of x turns around the trunk for every y primary branches. This is best understood with reference to FIG. 2, which is a top view of a portion of a solar array constructed in a similar manner to the array of FIG. 1; and FIG. 3, which is a side elevation view of the portion of the array of FIG. 2, taken along line 3-3 of FIG. 2. For the sake of simplicity of illustration, FIGS. 2 and 3 depict only the primary branches extending outwardly from the central trunk 12. It can be seen that the primary branches 22, 24, 26, 28, and 30 extend outwardly from the central trunk 12 sequentially in a spiral, as indicated by helical arrow 99.

The ratio of x turns around the trunk for every y primary branches may be derived from a phyllotaxic arrangement of branches and leaves on a plant. X may be a Fibonacci number, with y being its Fibonacci second successor. The ratio of x/y may be selected from certain Fibonacci ratios, including but not limited to 1/3, 2/5, 3/8, and 5/13. The choice of ratio is based upon the number and physical dimensions of PV panels required in the array, site location, and output power requirements. By way of example, the utilization of Fibonacci ratios with lower sequence numbers such as 1/3 and 2/5 are better suited to the utilization of energy collecting panels with larger dimensions, as these configurations by their nature permit additional area for mounting panels. These array patterns also enable achieving maximum power generation in the smallest physical space. Utilization of the 1/3 and 2/5 ratios are particularly suited for confined and obstructed installation sites. By virtue of their configurations, Fibonacci sequences with higher values such as 3/8 and 5/13 are better suited to larger arrays requiring a greater amount of energy collecting panels and with larger site requirements.

In the embodiment depicted in FIGS. 2 and 3, the ratio of x:y is 2/5. The progression of branches may be repeated. It can be seen that at the second complete turn of the spiral, repetition begins with branch 32 located directly above branch 22, and continues with branch 34 located directly above branch 24. Depending upon the size of the desired solar array, the repeating branches may continue beyond branch 34. It is to be understood that the primary branches 22 et seq. may be longer than depicted in FIGS. 2 and 3, so as to hold more solar cells 50 (FIG. 1). In embodiments in which the number of primary branches 20 is greater than y, the spiral arrangement may partially repeated if the number is between y and 2y, or repeated multiple times if the number of primary branches 20 is greater than 2y.

In certain embodiments, the primary branches 20 may be further comprised of secondary branches extending outwardly from the central primary branches 20 in the repeating spiral arrangement of x turns around a primary branch for every y secondary branches, with the photovoltaic panels 50 being joined to the secondary branches. This is best understood with reference to FIG. 4, which is a top view of a portion of a solar array constructed in a similar manner to the array of FIG. 1, and FIG. 5, which is a side elevation view of the portion of the array of FIG. 4, taken along line 5-5 of FIG. 4. It can be seen that secondary branches 36 and 38 extend from primary branch 26, and secondary branches 40 and 42 extend from primary branch 28. Solar cells 51 and 52 are joined to secondary branch 36; solar cells 53 and 54 are joined to secondary branch 38; solar cells 55 and 56 are joined to secondary branch 40; and solar cells 57 and 58 are joined to secondary branch 42.

Figure 4:
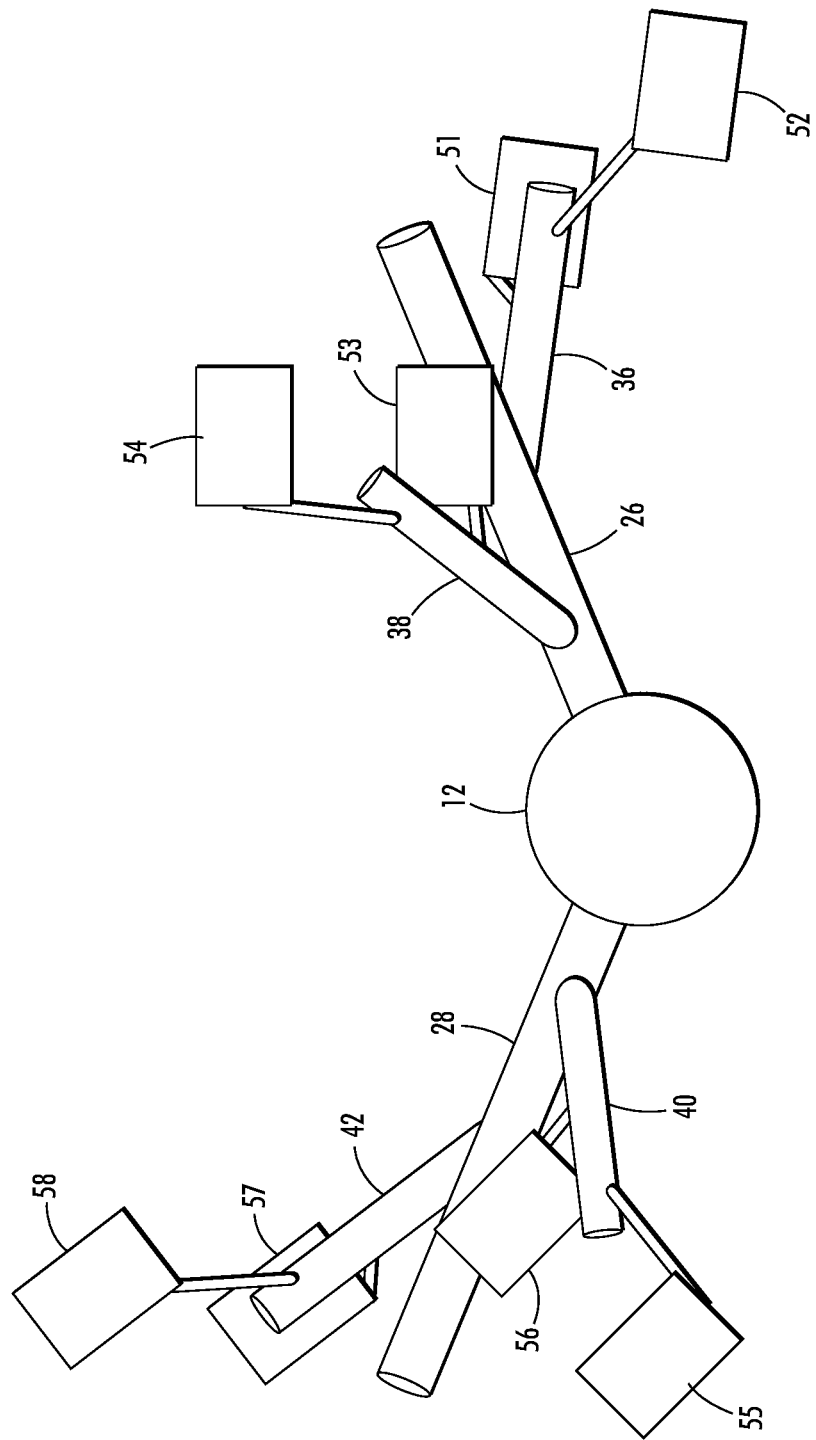
FIG. 4 is a top view of a portion of a photovoltaic array constructed in a similar manner to the array of FIG. 1, the view depicting primary branches extending outwardly from a central trunk, secondary branches extending outwardly from the primary branches, and solar cells joined to the secondary branches.
Figure 5:
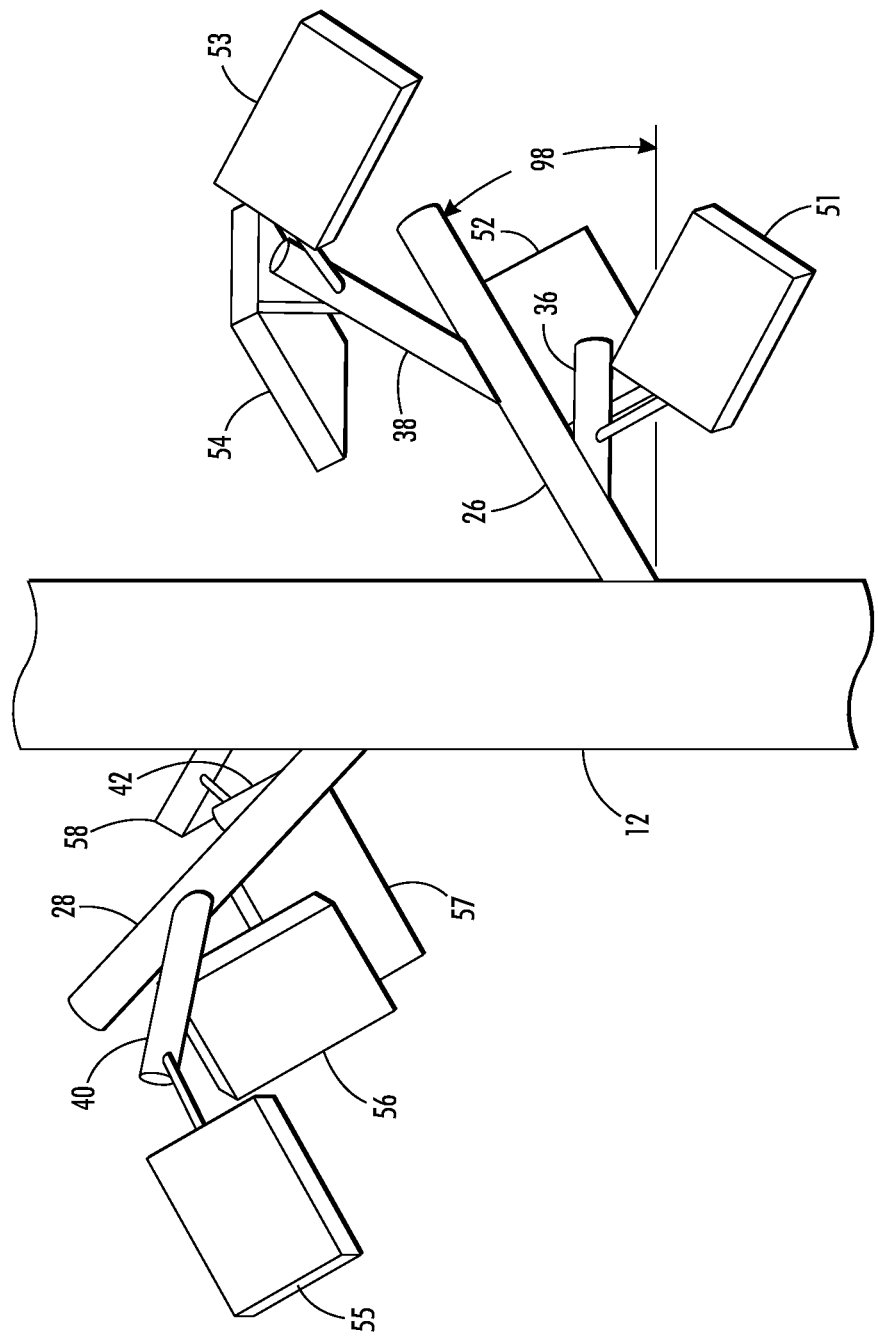
FIG. 5 is a side elevation view of the portion of the array of FIG. 4, taken along line 5-5 of FIG. 4.

It is to be understood that the number of secondary branches may be greater than shown in FIGS. 1, 4, and 5. In embodiments in which the number of secondary branches is greater than y, the spiral arrangement may partially repeated if the number is between y and 2y, or repeated multiple times if the number of primary branches is greater than 2y.

In one embodiment, as depicted in FIG. 5, the primary branches may emanate upwardly from the central trunk at an angle 98 of 30 degrees from horizontal. Additionally, in a further embodiment, the secondary branches, e.g., branches 36 and 38 may emanate outwardly from the primary branches, e.g., branch 26 at an angle of 60 degrees with respect to the primary branches. In a further embodiment, the photovoltaic panels 50 may be joined to the secondary branches at an inclination angle of ±10 degrees of the latitude of the physical location on Earth where the array 10 is situated. By way of illustration, if the array is situated at 40 degrees north latitude, the photovoltaic panels 50 may be joined to the secondary branches with their solar energy receiving surfaces at an inclination angle of between 30 and 50 degrees from horizontal.

In further embodiments, the secondary branches may be further comprised of tertiary branches extending outwardly from the secondary branches in the repeating spiral arrangement of x turns around the secondary branch for every y tertiary branches. In such a configuration, the photovoltaic panels 50 are joined to the tertiary branches. The branching may be continued in the same manner until a sufficient number of terminal branches for the required amount of photovoltaic panels for the PV array are provided. If n is the number of levels of branches in the hierarchy of branches, the final branches are the nth level of branches. Accordingly, the (n−1)th branches are comprised of a plurality of nth branches extending outwardly from the (n−1)th branches in the repeating spiral arrangement of x turns around an (n−1)th branch for every y nth branches. The photovoltaic panels are joined to the nth branches, the final branches in the hierarchy.

The PV panels joined to each primary branch, secondary branch, or tertiary branch may be connected in series to increase voltage production. Groups of the PV panels, such as groups on secondary branches may also be connected in series circuits in order to increase voltage, or alternatively, in parallel circuits to increase current.

In alternative embodiments, the spacing and angles of the branches and/or the PV panels may be modified to address ambient environmental factors at the location of placement of the PV array 10. This may be accomplished by adjusting the angle of each PV panel in relation to the horizon, and/or by utilizing variations of Fibonacci branch configurations.

Figure 6:
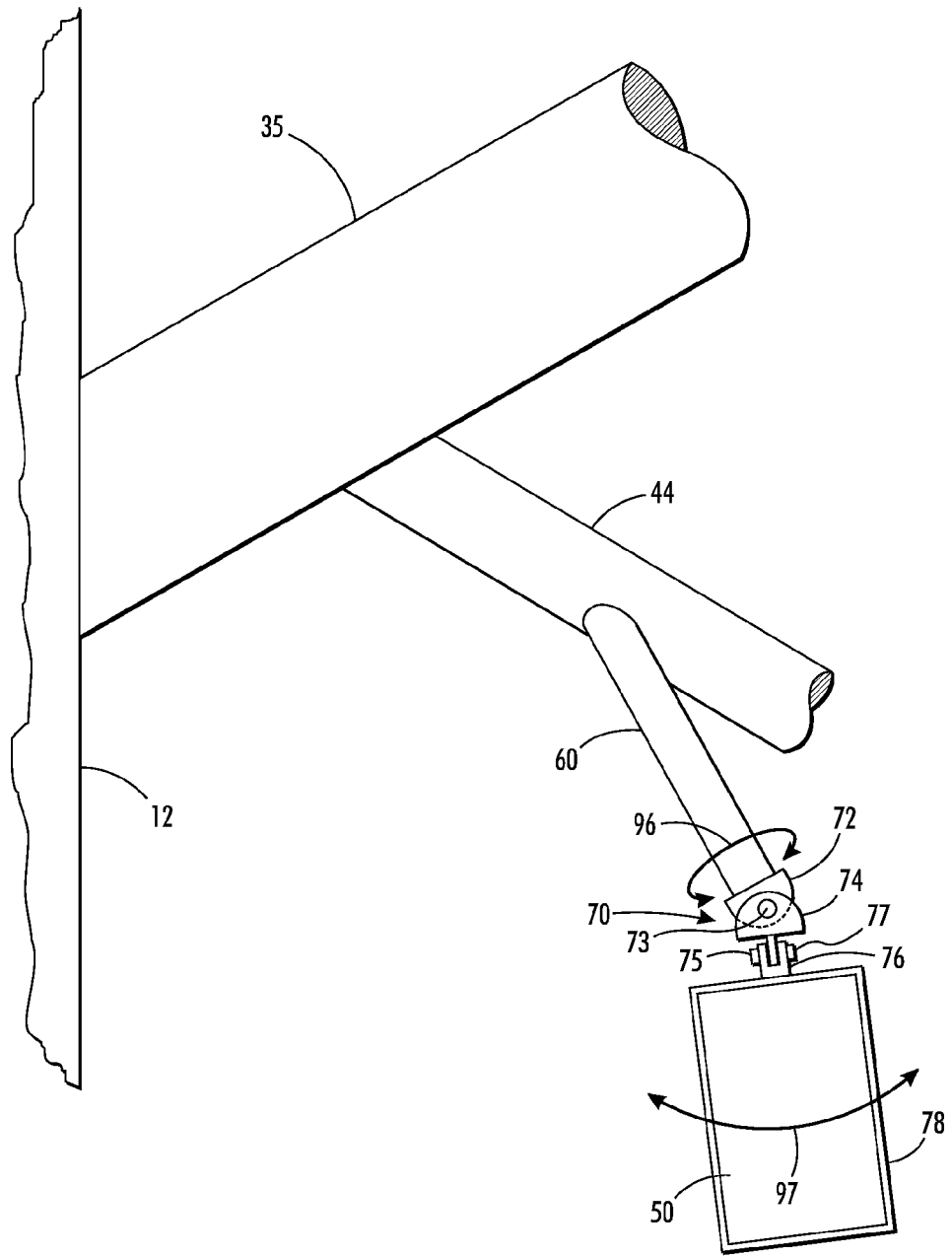
FIG. 6 is a side elevation view of one adjustable mounting fixture for joining a solar cell to a branch.

FIG. 6 is a side elevation view of one adjustable mounting fixture for joining a solar cell to a branch, which enables adjustment of the angle of the PV panel. In the embodiment depicted in FIG. 6, the array is comprised of a central trunk 12, a primary branch 35 joined to the central trunk 12, a secondary branch 44 joined to the primary branch 35, a tertiary branch 60 joined to the secondary branch 44, and a PV panel 50 joined to the tertiary branch 60 via the adjustable mounting fixture 70. Although the PV panel 50 is depicted as being joined to the tertiary branch 60, the adjustable fixture may be used to join the PV panel to lower or higher level branches in the same manner.

The adjustable fixture 70 is comprised of a cap 72, an intermediate hinge piece 74, and a clevis 76 that is joined to a frame or plate 78. The PV panel 50 is joined to the frame or plate 78 by suitable fasteners (not shown) or by adhesive or other suitable means. The cap 72 is joined to the end of the tertiary branch 60. The intermediate hinge piece 74 is joined to the cap 72 by a suitable fastener such as bolt 73 and a nut (not shown). The intermediate hinge piece 74, and the clevis 76, frame 78, and PV panel 50 joined thereto are pivotable with respect to cap 72 when the fastener 73 is loose, as indicated by arcuate arrow 97. In like manner, the intermediate hinge piece 74 is joined to the clevis 76 by a suitable fastener such as bolt 75 and a nut 77. Thus, the clevis 76, frame 78, and PV panel 50 are pivotable in the plane of FIG. 6 with respect to the intermediate hinge piece 74 when the fastener 75/77 is loose. The cap 72 may also be rotatable on the end of the tertiary branch 60, as indicated by arcuate arrow 96.

Thus the angle of the PV panel 50 with respect to horizontal, and the direction that the PV panel 50 faces is fully adjustable by adjustable fixture 70. Other means for adjusting the position of the PV panels 50 are contemplated, such as ball-and-socket fittings.

EXAMPLE

Array Design

It is to be understood that the following example is illustrative of one embodiment of the invention; the invention is not limited in any way to this example.

A solar array was constructed in accordance with the teachings in this disclosure, using a 2/5 Fibonacci ratio. Dimensions provided in this example are approximate. The central trunk, primary, and secondary branches were made of polyvinyl chloride (PVC) piping. The central trunk measured 78 inches in length and 9 inches in diameter. The primary branches were 36 inches in length and 3 inches in diameter. The secondary branches were 18 inches in length and 1% inches in diameter. The central trunk served both as a support for the entire PV assembly joined thereto, and as a central conduit for wiring and electronic components relevant to the operation of the array. The central trunk was provided with a support base, thereby permitting the array to be free-standing. Alternatively, the central trunk could be mounted into the ground or onto another structure. The support base may also be configured to contain supporting accessories such as inverters, solar chargers or power distribution circuitry.

The array was further comprised of forty (40) polycrystalline silicon photovoltaic panels rated at 200 mW and 0.50 Volts, model #700-21326-00, manufactured by SUNDANCE SOLAR of Hopkinton, N.H. The panels measured 76.2 mm (3.0")×44.45 mm (1.75")×12.7 mm (0.5") The calculated energy efficiency of each panel was as follows: maximum power at standard test conditions ($P_m$) @200 mw; maximum power voltage @0.50 Vdc; maximum power current @ 400 mA; open circuit voltage ($V_{OC}$): 0.50; and resistance @1.25 ohms. The Applicants believe that this embodiment would be useful for powering small pump and irrigation systems, for example. For the purposes of experimental testing and data recording described subsequently herein, the array was calibrated with a load and maximum output of 3.0 VDC and 20.0 mA.

In the following description of the branch arrangements, each primary branch is designated by vertical rank on the main trunk (i.e. Branch 1, Branch 2, Branch 3, Branch 4, etc.). The central axis of the central trunk operates as the compass center for measuring and conforming to the Fibonacci sequence utilized.

Primary branch 1 was positioned on the central trunk at 14 inches from the bottom thereof. Branch 1, along with all secondary branches in the array, were oriented to emerge from the main trunk at a vertical thirty (30) degree angle to the horizon. Primary and secondary branches were welded to the main trunk and supported from underneath by stainless steel angle braces for additional support.

The circumferential sequential spacing of the branches for the 2/5 Fibonacci ratio was determined by the formula (360 degrees×2)/5=144 degrees. Thus for the Fibonacci pattern of 2/5, the branches are placed in 144 degree increments around a branch. For the purposes of conforming to the Fibonacci pattern, the location of placement of primary Branch 1 was designated Zero (0) degrees. Starting with Branch 1 and moving upward in an anti-clockwise spiral orientation, the Fibonacci sequence placed Branch 2 at 14 inches above Branch 1 oriented at an angle of 144 degrees counter-clockwise to Branch 1 position at Zero (0) degrees below it on the central trunk.

The next branch, Branch 3, was placed at distance of 14 inches vertically up the main trunk above Branch 2. Branch 3 was oriented at an angle of 144 degrees counter-clockwise to Branch 2 below and 288 degrees counter-clockwise to Branch 1 below.

The next branch, Branch 4, was placed 14 inches vertically up the central trunk above Branch 3. Branch 4 was oriented at an angle of 144 degrees counter clock-wise to Branch 3 below and 72 degrees counter-clockwise to Branch 1 below.

The next branch, Branch 5, was placed 14 inches vertically up the main trunk above Branch 4. Branch 5 was oriented at an angle of 144 degrees counter clock-wise to Branch 4 below and 216 degrees counter-clockwise to Branch 1 below.

The next branch, Branch 6, was placed 14 inches vertically up the central trunk above Branch 5. Branch 6 was oriented at an angle of 144 degrees counter clock-wise to Branch 5 below and located back at a position vertically above Branch 1 at Zero (0) degrees.

The secondary branches for the array are designated Branch S-1, Branch S-2, Branch S-3, Branch S-4, and Branch S-5. In placement and orientation of secondary branches, the Fibonacci pattern utilizes the central axis of each primary branch (Branch 1-6) for a central compass point and calculation of Fibonacci angles. All secondary branches were weld mounted to primary branches, with dual angle braces provided for further support.

Branch S-1 was placed on Branch 1 at a point midway on Branch 1. Branch S-1 originated from Branch 1 at a 30 degree angle upwards to an imaginary plane running the center length of Branch 1.

Branch S-2 was placed on Branch 2 at a point midway on Branch 2. Branch S-2 originated from Branch 2 at a 30 degree angle upwards to an imaginary plane running the center length of Branch 2.

Branch S-3 was placed on Branch 3 at a point midway on Branch 3. Branch S-3 originated from Branch 3 at a 30 degree angle upwards to an imaginary plane running the center length of Branch 3.

Branch S-4 was placed on Branch 4 at a point midway on Branch 4. Branch S-4 originated from Branch 4 at a 30 degree angle upwards to an imaginary plane running the center length of Branch 4.

Branch S-5 was placed on Branch 5 at a point midway on Branch 5. Branch S-5 originated from Branch 5 at a 30 degree angle upwards to an imaginary plane running the center length of Branch 5.

Branch S-6 was placed on Branch 6 at a point midway on Branch 6. Branch S-6 originated from Branch 6 at a 30 degree angle upwards to an imaginary plane running the center length of Branch 6.

A PV solar panel was mounted at the end of each primary branch or secondary branch. Each panel was mounted on an adjustable swivel bracket that attached as a cap to the end of each branch. The swivel bracket allowed movement of the panel for adjustment and orientation to the sun's track. The PV panel was oriented to 30 degrees in relation to the horizon.

Wiring and cables for the PV panels were run from each PV panel through the hollow interior of its parent branch. The panels on each of Branches 1-6 were connected in series to each other. The primary branches were connected in parallel at junction boxes at the terminus of each primary branch in order to reduce and consolidate wiring. Main power leads were routed through the central trunk to ancillary support and power distribution equipment.

Experimental Results

A solar array having a configuration highly similar to that described above was tested at a location in an open yard located in Northport N.Y. (i.e. on Long Island N.Y.) at 40.9034890 north latitude, −73.3403400 longitude. The testing was performed on sunny days that occurred from Dec. 17-19, 2011, and was therefore essentially at winter solstice conditions. (On the exact winter solstice, December 22, cloudy weather prevented testing.)

Figure 7A:
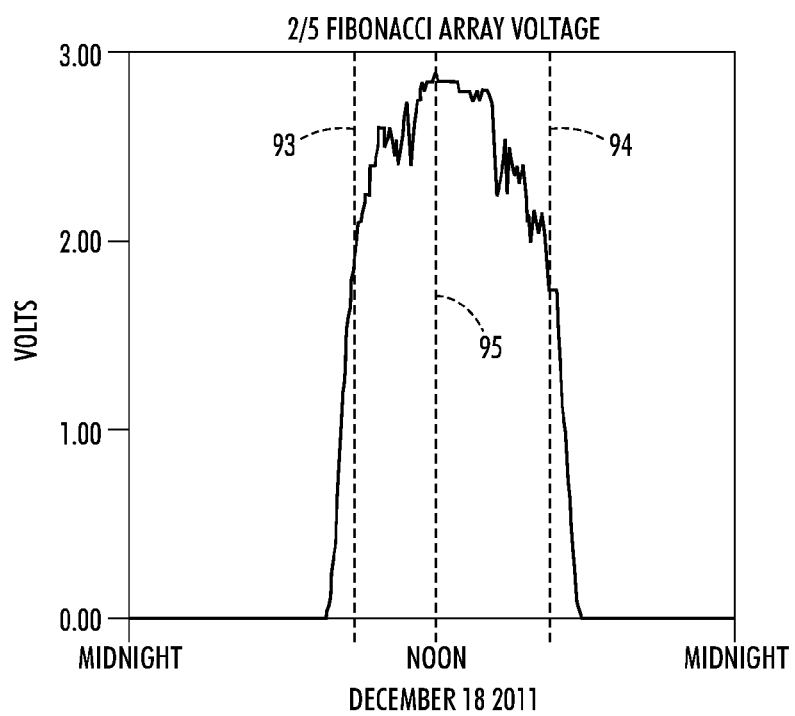
FIGS. 7A and 7B are graphs of voltage and current output, respectively, of one experimental embodiment of the Applicants' solar array, tested near the winter solstice.
Figure 7B:
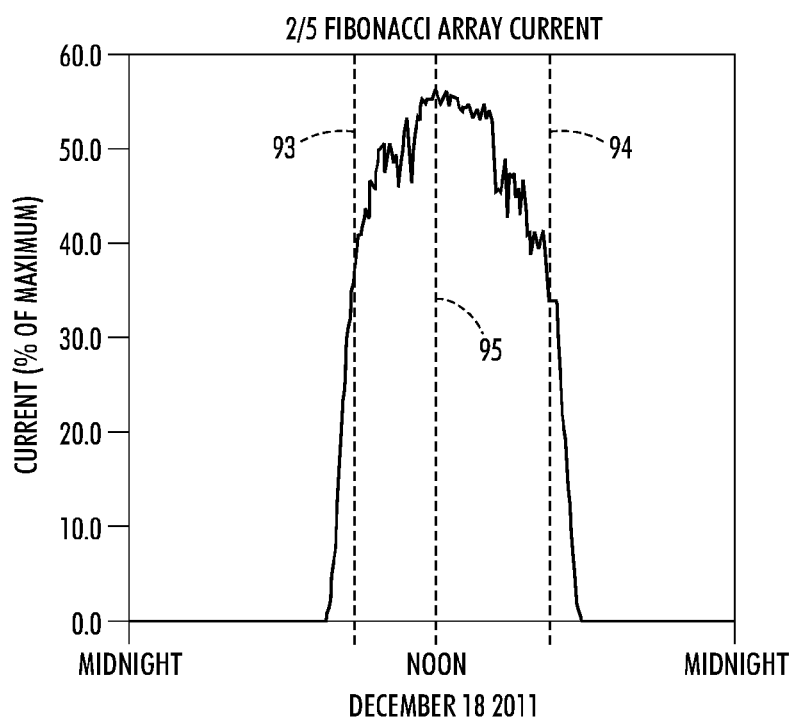

FIGS. 7A and 7B are graphs depicting the outputs of the experimental solar array on Dec. 18, 2011. FIG. 7A depicts array output voltage, and FIG. 7B depicts output current expressed as a percentage of a maximum possible array output current of 20.0 milliamperes. At approximately noon (indicated by dotted line 95), the peak output voltage reached approximately 2.9 volts, and the peak output current reached approximately 55% of the maximum. It can be seen that between the hours of about 9 AM and about 4 PM (dotted lines 93 and 94, respectively), a relatively high level or power (voltage×current) is maintained. Thus for most of the daylight hours (sunrise and sunset on the winter solstice being 7:15 AM and 4:28 PM), the Applicants' experimental solar array produced useful power, with a significant decrease only occurring at the early and late daytime hours.

Figure 8:
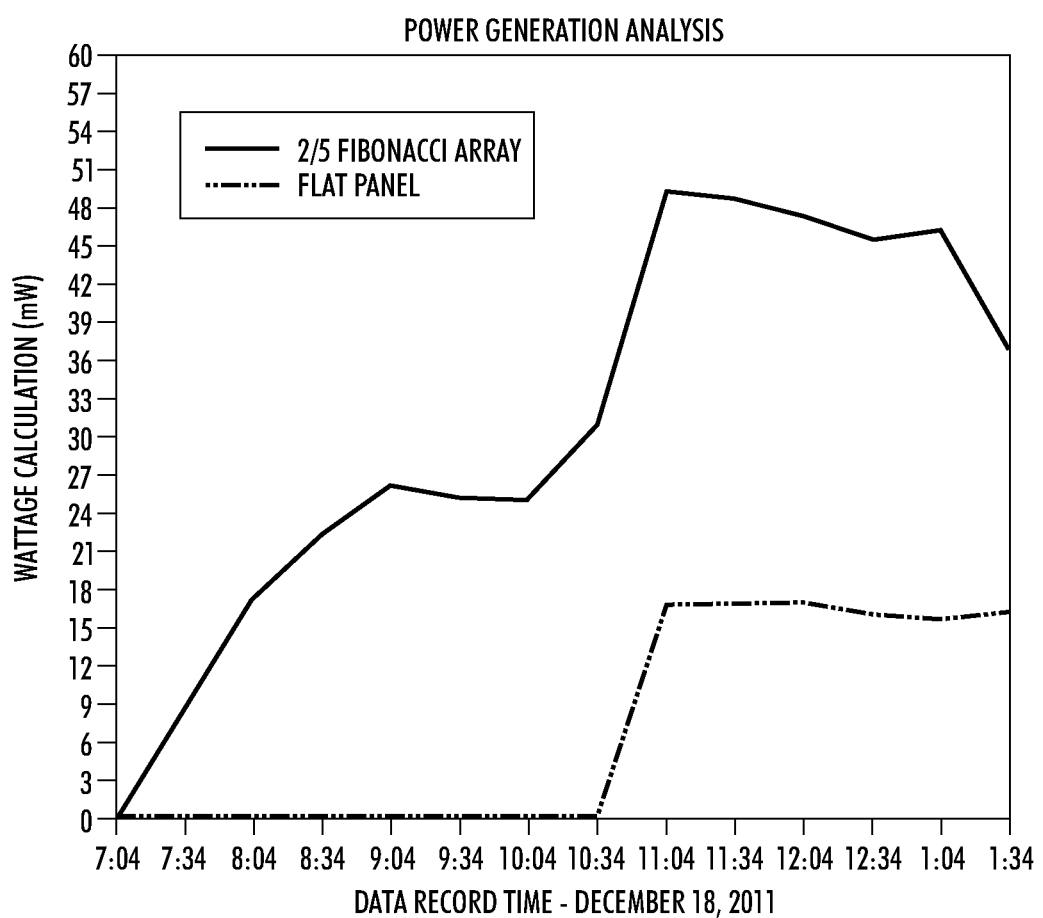
FIG. 8 is a graph of calculated output power of the experimental embodiment of the Applicants' solar array, as well as the output power of a comparable conventional flat plane solar array.

FIG. 8 is a graph of calculated output power of the Applicants' experimental array, as well as the output power of a comparable conventional flat plane solar array, which contained the same number and type of solar cells arranged in the typical planar configuration of rows and columns. The flat panel was comprised of Polycrystalline silicon photovoltaic panels rated at 200 mW and 0.50 Volts, model #700-21326-00, manufactured by SUNDANCE SOLAR of Hopkinton, N.H. The panels measured 76.2 mm (3.0")×44.45 mm (1.75")×12.7 mm (0.5") The calculated energy efficiency of each panel was as follows: maximum power at standard test conditions ($P_m$) @200 mw; maximum power voltage @0.50 Vdc; maximum power current @400 mA; open circuit voltage ($V_{OC}$): 0.50; and resistance @1.25 ohms. For the purposes of experimental testing and data recording, the array was similarly calibrated with a load and maximum output of 3.0 Vdc and 20.0 mA. In obtaining the data of FIG. 8, the conventional "control" array was placed near the Applicants' array and aimed southward at an angle of 40 degrees of inclination, which was considered optimum for collecting solar energy at noon at the location of the experiment.

The data presented in FIG. 8 is only provided from about 7:04 AM up until about 1:34 PM. However, it can be seen that over this time, the Applicants' solar array produced a significantly higher power level, over a considerably longer period of time that the conventional flat plane solar array. Since the area under the respective curves is total energy produced, it can be seen that the Applicants' solar array produced about 4-5 times the total energy as compared to the conventional flat plane solar array. In performing this and other experiments, the Applicants have also discovered that their array is not prone to "crashing," i.e., a high drop-off of voltage at the p-n junction when shadows are cast upon the array or direct sunlight is obstructed, as compared to the conventional flat plane solar array. This unexpected finding is considered to be a significant additional advantage over conventional flat plane arrays.

Examples

Alternative Embodiments Having Different Fibonacci Ratios

It is to be understood that the following examples of alternative designs are illustrative of alternative embodiments of the invention; the invention is not limited in any way to these examples.

Common Features of Array Designs

The following exemplary solar arrays, which may be fabricated according to the general teachings of this disclosure share a number of common features with each other, and with the above recited EXAMPLE solar array having a 2/5 Fibonacci ratio. The solar arrays are comprised of a central trunk, which is typically oriented vertically. The central trunk and its primary and secondary branches are made of a suitable structural material, such as e.g., aluminum tubing or PVC piping. The dimensions of the vertical length of the central trunk may be specified to any size but should accommodate the size of the PV panels utilized and the anticipated site of the PV array. In certain preferred embodiments, the diameter of the central trunk has a ratio of at least 3:1 in relation to the diameter of the primary branches. This proportion allows for stable support as well as room for wiring and conduit that may be contained therein. The array is further comprised of primary branches joined to the central trunk as described previously herein. The PV panels in the array may be attached to the primary branches. Each primary branch is positioned on a central trunk support in a mathematical proportion that adheres to the Fibonacci sequence ratio that is selected for the array design. This ratio indicates the number of primary branches joined to the central trunk for every one (1) spiral made around the central trunk. For the purposes of identification, each primary branch may be designated by vertical rank on the central trunk (i.e. Branch 1, Branch 2, Branch 3, Branch 4, etc.) The central axis of the central trunk operates as a compass center for measuring and conforming to the Fibonacci sequence utilized. The array may be further comprised of secondary branches joined to the primary branches, and tertiary branches joined to the secondary branches, with both branch levels being joined in the selected Fibonacci sequence. The PV panels in the array may be joined to the secondary branches, or to the tertiary branches if they are present.

Depending upon the hierarchy of branches of the array, a PV solar panel may be mounted at the end of each primary branch, secondary branch or tertiary branch. In arrays that utilize smaller PV panels (e.g., panels weighing less than about 13 pounds and/or having an output of between 20 and 55 watts), the panel may be mounted on an adjustable swivel bracket that attaches as a cap to the end of each branch, as shown in FIG. 6 and described previously herein. The swivel bracket allows movement of the panel for adjustment and orientation to the sun's track. In certain embodiments, the PV panel may be oriented between 30 degrees and 50 degrees of inclination in relation to the horizon. In larger arrays with panels weighing more than 13 pounds, the PV panels may be mounted by using a modified side-pole configuration that is positioned at the center point of the secondary branch and oriented between 30 degrees and 50 degrees to the horizon.

The central trunk serves both as a constructive support for the primary and higher level branches and the PV panels, and may also serve as a central conduit for wiring and electronic components supporting the operation of the array. The central truck may be mounted into the ground or on a structure, or alternatively, mounted on a support base as a self-contained unit that contains support equipment such as inverters, solar chargers or power distribution circuitry. Wiring and cables for the panels may be run from each PV panel through the hollow interior of its parent branch. Junction boxes may be utilized at the terminus of each primary branch in order to reduce and consolidate wiring.

Array Design Using 1/2 Fibonacci Ratio

In an array designed with a 1/2 Fibonacci ratio, each primary branch is positioned on a central trunk in a mathematical proportion that adheres to the Fibonacci sequence ratio of 1/2. The 1/2 ratio indicates that two primary branches are distributed over every one spiral made around the central trunk. The circumferential sequential spacing of the branches for the 1/2 Fibonacci ratio is determined by the formula Spacing $S=360\times$(number of turns to complete Fibonacci spiral)/number of branches in sequence Therefore, S=360 degrees/2=180 degrees.

Thus for the Fibonacci pattern of 1/2, the branches are placed in 180 degree increments around the central trunk. For the purposes of conforming to the Fibonacci pattern, the location of placement of primary Branch 1 is designated as Zero (0) degrees. Starting with Branch 1 and moving upward in an anti-clockwise spiral orientation, the Fibonacci sequence places Branch 2 at 14 inches above Branch 1 oriented at an angle of 180 degrees counter-clockwise to the Branch 1 position of Zero degrees below it on the central trunk.

The next branch, Branch 3, is positioned at an equal amount of distance vertically up the main trunk as Branch 1 and Branch 2 respectively. Branch 3 is oriented at an angle of 180 degrees counter-clockwise to Branch 2 position below it. As the Fibonacci sequence 1/2 is being utilized, Branch 3 is located back at a position vertically above Branch 1 at its starting position of Zero degrees. Starting again at Branch 3 at the position of Zero degrees, the next branch, Branch 4, is placed again equidistant vertically up the central trunk, in an anti-clockwise configuration at 180 degrees to the position of Branch 3. This pattern is repeated with primary branches up the central trunk until the desired number of branches is provided.

In the event that additional PV panels are required for the array, secondary branches can be utilized and positioned on the primary branches (Branch 1, Branch 2, Branch 3 etc.) in the same configuration as presented above. In placement and orientation of secondary branches, the Fibonacci pattern utilizes the central axis of each primary branch for a central compass point and calculation of Fibonacci angles. In certain preferred embodiments, the diameter of primary branches has a ratio of at least 2:1 in relation to the diameter of the secondary branches in order to provide stable support and accessibility for wiring and conduit. In like manner, the array may be further comprised of tertiary branches joined to secondary branches in the same Fibonacci relationship.

Array Design Using 1/3 Fibonacci Ratio

In an array designed with a 1/3 Fibonacci ratio, each primary branch is positioned on a central trunk in a mathematical proportion that adheres to the Fibonacci sequence ratio of 1/3. The 1/3 ratio indicates that three primary branches are distributed over every one spiral made around the central trunk. The circumferential sequential spacing of the branches for the 1/3 Fibonacci ratio is determined by the formula as recited previously; therefore, Spacing $S$=360 degrees/3=120 degrees.

Thus for the Fibonacci pattern of 1/3, the branches are placed in 120 degree increments around the central trunk. For the purposes of conforming to the Fibonacci pattern, the location of placement of primary Branch 1 is designated as (0) degrees. Starting with Branch 1 and moving upward in an anti-clockwise spiral orientation, the Fibonacci sequence places Branch 2 at 14 inches above Branch 1 oriented at an angle of 120 degrees counter-clockwise to the Branch 1 position of Zero degrees below it on the central trunk.

The next branch, Branch 3, is positioned at an equal amount of distance vertically up the main trunk as Branch 1 and Branch 2 respectively. Branch 3 is oriented at an angle of 120 degrees counter-clockwise to Branch 2 position below it. Branch 3 is oriented at an angle of 120 degrees counter-clockwise to Branch 2 below and 240 degrees counter-clockwise to Branch 1 below. Branch 4 is placed at the same distance vertically up the main trunk as Branch 1, 2 and 3. Branch 4 is oriented at an angle of 120 degrees counter clock-wise to Branch 3 below and located back at a position vertically above Branch 1 at Zero degrees. Starting again at Branch 4 at the position Zero degrees, Branch 5 is placed again equidistant vertically up the main trunk in an anti-clockwise configuration at 120 degrees. This pattern is repeated with primary branches up the main trunk until the desired number of branches is provided.

In the event that additional PV panels are required for the array, secondary branches can be utilized and positioned on the primary branches (Branch 1, Branch 2, Branch 3 etc.) in the same configuration as presented above, as described for the 1/2 Fibonacci design described previously. Additionally, the array may be further comprised of tertiary branches joined to secondary branches in the same Fibonacci relationship.

Array Design Using 3/8 Fibonacci Ratio

In an array designed with a 3/8 Fibonacci ratio, each primary branch is positioned on a central trunk in a mathematical proportion that adheres to the Fibonacci sequence ratio of 3/8. The 3/8 ratio indicates that eight primary branches are distributed over every three spirals made around the central trunk. The circumferential sequential spacing of the branches for the 3/8 Fibonacci ratio is determined by the formula as recited previously; therefore, Spacing $S=360$ degrees×3/8=135 degrees.

Thus for the Fibonacci pattern of 3/8, the branches are placed in 135 degree increments around the central trunk. For the purposes of conforming to the Fibonacci pattern, the location of placement of primary Branch 1 is designated as Zero (0) degrees. Starting with Branch 1 and moving upward in an anti-clockwise spiral orientation, the Fibonacci sequence places Branch 2 at 14 inches above Branch 1 oriented at an angle of 135 degrees counter-clockwise to the Branch 1 position of Zero degrees below it on the central trunk.

Branch 3 is placed at an equal amount of distance vertically up the main trunk as Branch 1 and Branch 2 respectively. Branch 3 is oriented at an angle of 135 degrees counter-clockwise to Branch 2 below and 270 degrees counter-clockwise to Branch 1 below.

Branch 4 is placed at the same distance vertically up the main trunk as Branch 1, 2 and 3. Branch 4 is oriented at an angle of 135 degrees counter clock-wise to Branch 3 below and 45 degrees counter-clockwise to Branch 1 below.

Branch 5 is placed at the same distance vertically up the main trunk as Branch 1, 2, 3, and 4. Branch 5 is oriented at an angle of 135 degrees counter clock-wise to Branch 4 below and 180 degrees counter-clockwise to Branch 1 below.

Branch 6 is placed at the same distance vertically up the main trunk as Branch 1, 2, 3, 4, and 5. Branch 6 is oriented at an angle of 135 degrees counter clock-wise to Branch 5 below and 315 degrees counter-clockwise to Branch 1 below.

Branch 7 is placed at the same distance vertically up the main trunk as Branch 1, 2, 3, 4, 5, and 6. Branch 7 is oriented at an angle of 135 degrees counter clock-wise to Branch 6 below and 90 degrees counter-clockwise to Branch 1 below.

Branch 8 is placed at the same distance vertically up the main trunk as Branch 1, 2, 3, 4, 5, 6, and 7. Branch 8 is oriented at an angle of 135 degrees counter clock-wise to Branch 7 below and 225 degrees counter-clockwise to Branch 1 below.

Branch 9 is placed at the same distance vertically up the main trunk as Branch 1, 2, 3, 4, 5, 6, 7, and 8. Branch 9 is oriented at an angle of 135 degrees counter clock-wise to Branch 8 below and located back at a position vertically above Branch 1 at Zero degrees. This pattern is repeated with primary branches up the main trunk until the desired number of branches is provided.

Array Design Using 5/13 Fibonacci Ratio

In an array designed with a 5/13 Fibonacci ratio, each primary branch is positioned on a central trunk in a mathematical proportion that adheres to the Fibonacci sequence ratio of 5/13. The 5/13 ratio indicates that thirteen primary branches are distributed over every five spirals made around the central trunk. The circumferential sequential spacing of the branches for the 5/13 Fibonacci ratio is determined by the formula as recited previously; therefore, Spacing $S=360$ degrees×5/13=138.46 degrees.

Thus for the Fibonacci pattern of 5/13, the branches are placed in 138.46 degree increments around the central trunk. For the purposes of conforming to the Fibonacci pattern, the location of placement of primary Branch 1 is designated as Zero (0) degrees. Starting with Branch 1 and moving upward in an anti-clockwise spiral orientation, the Fibonacci sequence places Branch 2 at 14 inches above Branch 1 oriented at an angle of 138.46 degrees counter-clockwise to the Branch 1 position of Zero degrees below it on the central trunk.

Branch 3 is placed at an equal amount of distance vertically up the main trunk as Branch 1 and Branch 2 respectively. Branch 3 is oriented at an angle of 138.46 degrees counter-clockwise to Branch 2 below and 276.92 degrees counter-clockwise to Branch 1 below.

Branch 4 is placed at the same distance vertically up the main trunk as Branch 1, 2, and 3. Branch 4 is oriented at an angle of 138.46 degrees counter clock-wise to Branch 3 below and 55.38 degrees counter-clockwise to Branch 1 below.

Branch 5 is placed at the same distance vertically up the main trunk as Branch 1, 2, 3, and 4. Branch 5 is oriented at an angle of 138.46 degrees counter clock-wise to Branch 4 below and 193.84 degrees counter-clockwise to Branch 1 below.

Branch 6 is placed at the same distance vertically up the main trunk as Branch 1, 2, 3, 4, and 5. Branch 6 is oriented at an angle of 138.46 degrees counter clock-wise to Branch 5 below and 110.76 degrees counter-clockwise to Branch 1 below.

Branch 7 is placed at the same distance vertically up the main trunk as Branch 1, 2, 3, 4, 5, and 6. Branch 7 is oriented at an angle of 138.46 degrees counter clock-wise to Branch 6 below and 249.22 degrees counter-clockwise to Branch 1 below.

Branch 8 is placed at the same distance vertically up the main trunk as Branch 1, 2, 3, 4, 5, 6, and 7. Branch 8 is oriented at an angle of 138.46 degrees counter clock-wise to Branch 7 below and 27.68 degrees counter-clockwise to Branch 1 below.

Branch 9 is placed at the same distance vertically up the main trunk as Branch 1, 2, 3, 4, 5, 6, 7, and 8. Branch 9 is oriented at an angle of 138.46 degrees counter clock-wise to Branch 8 below or 219.5 degrees to Branch 1 below.

Branch 10 is placed at the same distance vertically up the main trunk as Branch 1, 2, 3, 4, 5, 6, 7, 8, and 9. Branch 10 is oriented at an angle of 27.5 degrees counter clock-wise to Branch 9 below and 166.14 degrees counter-clockwise to Branch 1 below.

Branch 11 is placed at the same distance vertically up the main trunk as Branches 1-10. Branch 11 is oriented at an angle of 138.46 degrees counter clock-wise to Branch 10 below and 83.06 degrees counter-clockwise to Branch 1 below.

Branch 12 is placed at the same distance vertically up the main trunk as Branches 1-11. Branch 12 is oriented at an angle of 138.46 degrees counter clock-wise to Branch 11 below and 221.52 degrees counter-clockwise to Branch 1 below.

Branch 13 is placed at the same distance vertically up the main trunk as Branches 1-12. Branch 13 is oriented at an angle of 138.46 degrees counter clock-wise to Branch 12 below or 329.5 degrees to Branch 1 below.

Branch 14 is placed at the same distance vertically up the main trunk as Branches 1-13. Branch 14 is oriented at an angle of 138.46 degrees counter clock-wise to Branch 13. An adjustment of 0.02 degrees may be made in the orientation of Branch 14 in order to locate Branch 14 precisely back at a position vertically above Branch 1 at Zero degrees. This pattern is repeated with secondary branches up the main trunk until the desired number of branches is provided.

It is, therefore, apparent that there has been provided, in accordance with the present invention, devices and methods for collecting electromagnetic radiation and converting such electromagnetic radiation to electrical energy, and in particular, devices and methods for converting solar energy to electrical energy. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. A photovoltaic energy apparatus comprising:
   a) a plurality of primary branches extending radially outwardly from a central trunk in a spiral arrangement having a ratio of x turns around the trunk for every y primary branches; and
   b) a plurality of photovoltaic panels joined to a plurality of corresponding adjustable mounting fixtures joined to the primary branches, each of the photovoltaic panels defining a panel plane and joined to one of the plurality of primary branches by a corresponding one of the plurality of adjustable mounting fixtures comprising a first member joined to the one of the plurality of primary branches, an intermediate hinge piece pivotably joined to the first member, and a second member joined to the photovoltaic panel and pivotably joined to the intermediate hinge piece;
   wherein for each photovoltaic panel, the corresponding adjustable mounting fixture is operable to enable adjustment of an inclination angle of the panel plane of the photovoltaic panel with respect to a horizontal plane, and adjustment of the panel plane with respect to the radially outward direction from the central trunk; and wherein the inclination angle of the panel planes of the photovoltaic panels with respect to the horizontal plane, and the directions of the panel planes with respect to the radially outward direction from the central trunk are each individually adjusted to provide the plurality of photovoltaic panels with a range of inclination angles with respect to the horizontal plane of between zero and ninety degrees, and a range of directions of the panel planes radially outwardly between zero and 360 degrees around the central trunk.

2. The apparatus of claim 1, wherein the ratio of x:y is derived from a phyllotaxic arrangement of branches and leaves on a plant.

3. The apparatus of claim 1, wherein x is a Fibonacci number and y is its Fibonacci second successor.

4. The apparatus of claim 3, wherein the ratio is selected from the group consisting of 1/3, 2/5, 3/8, and 5/13.

5. The apparatus of claim 4, wherein the Fibonacci number and its second successor are 2 and 5.

6. The apparatus of claim 1, wherein the plurality of primary branches extend outwardly from the trunk in a repeating spiral arrangement having a ratio of x turns around the trunk for every y primary branches.

7. The apparatus of claim 1, wherein the secondary branches extend outwardly from the primary branches in a repeating spiral arrangement having a ratio of x turns around the primary branches for every y secondary branches.

8. The apparatus of claim 1, wherein the primary branches emanate upwardly from the central trunk at an angle of 30 degrees from a horizontal plane passing through the central trunk.

9. The apparatus of claim 8, wherein the secondary branches emanate outwardly from the primary branches at an angle of 60 degrees with respect to the primary branches.

10. The apparatus of claim 1, wherein the photovoltaic panels are joined in a Fibonacci sequence.

11. The apparatus of claim 1, wherein the primary branches are further comprised of secondary branches extending outwardly from the primary branches in the spiral arrangement of x turns around a primary branch for every y secondary branches, and wherein the adjustable mounting fixtures of the photovoltaic panels are joined to the secondary branches.

12. The apparatus of claim 11, wherein the secondary branches are further comprised of tertiary branches extending outwardly from the secondary branches in the spiral arrangement of x turns around a secondary branch for every y tertiary branches, and wherein the adjustable mounting fixtures of the photovoltaic panels are joined to the tertiary branches.

13. A photovoltaic energy apparatus comprising:
   a) a plurality of primary branches extending radially outwardly from a central trunk in a spiral arrangement having a ratio of x turns around the trunk for every y primary branches; and
   b) a plurality of photovoltaic panels joined to a plurality of corresponding adjustable mounting fixtures joined to the primary branches, each of the photovoltaic panels defining a panel plane and joined to one of the plurality of primary branches by a corresponding one of the plurality of adjustable mounting fixtures comprising a first member joined to the one of the plurality of primary branches, an intermediate hinge piece pivotably joined to the first member, and a second member joined to the photovoltaic panel and pivotably joined to the intermediate hinge piece;
   wherein for each photovoltaic panel, the corresponding adjustable mounting fixture is operable to enable adjustment of an inclination angle of the panel plane of the photovoltaic panel with respect to a horizontal plane, and adjustment of the panel plane with respect to the radially outward direction from the central trunk; and wherein the first members of the adjustable mounting fixtures are caps rotatably adjustable with respect to the primary branches.

14. A photovoltaic energy apparatus comprising:
   a) a plurality of primary branches extending radially outwardly from a central trunk in a spiral arrangement having a ratio of x turns around the trunk for every y primary branches; and
   b) a plurality of photovoltaic panels joined to a plurality of corresponding adjustable mounting fixtures joined to the primary branches, each of the photovoltaic panels defining a panel plane and joined to one of the plurality of primary branches by a corresponding one of the plurality of adjustable mounting fixtures comprising a first member joined to the one of the plurality of primary branches, an intermediate hinge piece pivotably joined to the first member, and a second member joined to the photovoltaic panel and pivotably joined to the intermediate hinge piece;
   wherein for each photovoltaic panel, the corresponding adjustable mounting fixture is operable to enable adjustment of an inclination angle of the panel plane of the photovoltaic panel with respect to a horizontal plane, and adjustment of the panel plane with respect to the radially outward direction from the central trunk; and wherein each of the adjustable mounting fixtures is comprised of a first fastener joining the respective first member to the intermediate hinge piece, and a second fastener joining the respective second member to the intermediate hinge piece, each of the first and second fasteners adjustable to immobilize the respective first member with respect to the intermediate hinge piece, and immobilize the respective second member with respect to the intermediate hinge piece, thereby immobilizing the respective photovoltaic panel joined to the adjustable mounting fixture with respect to the central trunk.

* * * * *